United States Patent [19]

Nishi et al.

[11] Patent Number: 5,625,861
[45] Date of Patent: Apr. 29, 1997

[54] POROUS METAL BODY AND PROCESS FOR PRODUCING SAME

[75] Inventors: Takashi Nishi, Hirakata; Akira Kosaka, Neyagawa; Jun Funakoshi, Suita; Ryutaro Motoki, Hirakata, all of Japan

[73] Assignee: Kubota Corporation, Osaka, Japan

[21] Appl. No.: 544,891

[22] Filed: Oct. 18, 1995

[30] Foreign Application Priority Data

Oct. 20, 1994 [JP] Japan .................................. 6-255228
Dec. 12, 1994 [JP] Japan .................................. 6-307327
Dec. 12, 1994 [JP] Japan .................................. 6-307328

[51] Int. Cl.$^6$ .................................................. B22F 1/00
[52] U.S. Cl. ........................... 419/2; 419/23; 419/38
[58] Field of Search ........................... 419/23, 2, 38

[56] References Cited

U.S. PATENT DOCUMENTS 4,455,354  6/1984  Dillon et al. .......................... 428/568
5,322,657  6/1994  Hirzel .................................. 264/115

OTHER PUBLICATIONS

Japanese Patent Abstract of 1–205846 published Aug. 18, 1989, Toshio Ogiwara, "Metallic Mold for Casting Metal".
Japanese Patent Abstract of 3–170656 Published Jul. 24, 1991, Yoshihiro Sugitani, "Metal Mold Made of Aluminum Alloy".
Japanese Patent Abstract of 4–72004 Published Mar. 6, 1992, Jiro Ichikawa, "Manufacture of Porous Metallic Mold".
Japanese Patent Abstract of 4–83603 Published Mar. 17, 1992, Takashi Mizukusa, "Mold for Ceramic Molding".
Japanese Patent Abstract of 4–339624 Published Nov. 26, 1992, Yukinori Kurino, "Injection Mold".
Japanese Patent Abstract of 3–239509, Published Oct. 25, 1991, Takeji Sekiya, "Manufacture of Molding Die Decorative Plastics".
Japanese Patent Abstract of 4–308048 Published Oct. 30, 1992, Masahiko Mizukami, "Production of Porous Tungsten Material".
Japanese Patent Abstract of 6–33112 Published Feb. 8, 1994, Tatsuhiko Kato, "Production of Porous Mold Material".

*Primary Examiner*—Peter A. Nelson
*Assistant Examiner*—Anthony R. Chi
*Attorney, Agent, or Firm*—Armstrong, Westerman, Hattori, McLeland and Naughton

[57] ABSTRACT

The porous metal body of the inventtion has a porosity of 7 to 50%, pore sizes of 1 to 500 μm and a pore distribution satisfying the relationship of:

$$(D_{95}-D_5)/D_{50} \leq 2.5$$

wherein $D_5$ is the pore size on the cumulative distribution curve of the pore sizes at a cumulative frequency of 5%, $D_{50}$ is the pore size on the curve at a cumulative frequency of 50% and $D_{95}$ is the pore size on the curve at a cumulative frequency of 95%. The porous body is improved in porosity characteristics and mechanical strength.

The porous metal body is prepared by pressing a metal powder to shape and sintering the shaped body by hot isostatic pressing, or alternatively by enclosing a metal powder in a capsule, subjecting the encapsulated powder to a primary sintering treatment in an isostatic medium to form a primary sintered porous body and heat-treating the sintered body with the capsule removed or without removing the capsule.

8 Claims, 1 Drawing Sheet

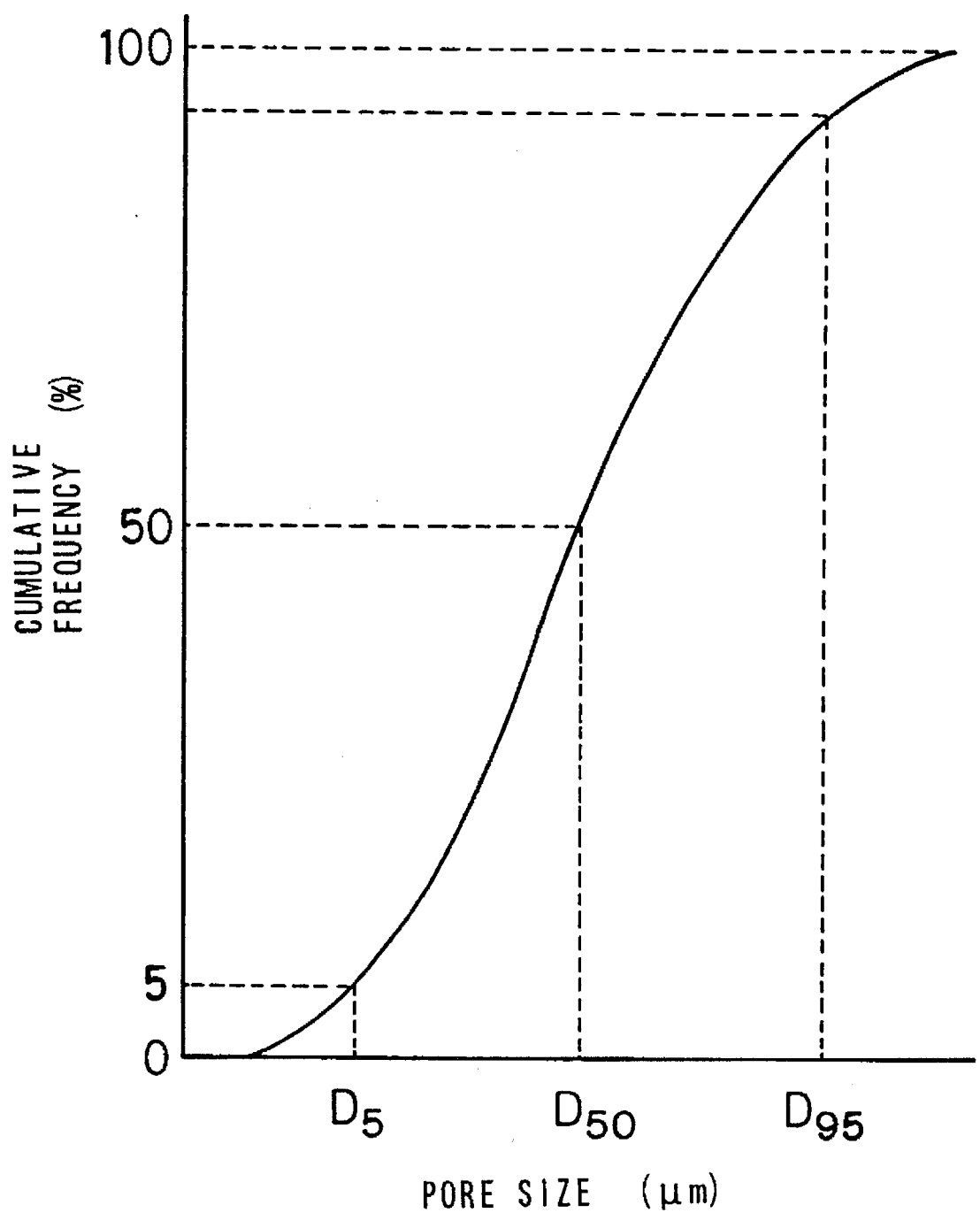

POROUS METAL BODY AND PROCESS FOR PRODUCING SAME

FIELD OF INDUSTRIAL APPLICATION

The present invention relates to porous metal bodies especially suited as materials for molds or dies for molding resins with heating or casting metals, and as materials for filters for use at high temperatures as in refuse incinerators.

BACKGROUND OF THE INVENTION

The dies for use in molding resins (e.g., expansion molding, injection molding, compression molding and blow molding) or in casting metals (e.g., low-pressure casting and die casting of aluminum alloys, etc.) must be formed with vent ports for the escape of air from inside the cavity or a gas evolved from the resin or cast metal. Heretofore used as such dies are those wherein a vent port is formed in the required portion by machining.

To improve the efficiency of molding or casting operation and the quality of moldings or castings, attempts have recently been made to use dies having a porous metal body locally incorporated therein or those entirely made of a porous metal body. Various proposals have been made as to processes for producing porous bodies and construction of dies (JP-A-1-205846, JP-A-3-170656, JP-A-4-72004, JP-A-4-83603, JP-A-4-339624, etc.).

Porous metal bodies are useful also for a wide variety of applications. Besides the application to dies and attachments therefor, it is attempted to use such bodies as filters for gases and fine particles, as sensors and catalyst carriers exploiting their feature of having a great specific surface area, as soundproof or damping materials utilizing vibration transmission attenuating characteristics, and as heat-insulating materials utilizing the heat-insulating properties of the porous structure.

To be useful for these applications, the porous metal body needs to have its porosity and pore sizes suitably adjusted in conformity with the mode of use and to possess the required mechanical properties. Various processes have been proposed for producing such porous metal bodies. These proposals include a process wherein a mixture of metal fiber as of stainless steel adjusted to a specified size and metal powder is pressed to shape, and the shaped powder body is sintered in a vacuum or reducing atmosphere, a process where such a shaped power body as sintered is subjected to a nitriding treatment to give an increased strength and higher hardness, and a process wherein a powder starting material is pressed to shape at a low pressure and further pressed at a higher pressure to obtain a body of powder as shaped by two-step pressing, and the shaped powder body is thereafter sintered in a specified atmosphere. (See, for example, JP-A-3-239509, JP-A4-72004, JP-A-4-308048, and JP-A-6-33112)

With these conventional processes, the shaped powder body obtained by pressing a powdery material is sintered at atmospheric pressure, and this presents difficulty in controlling the porosity and pore size of the porous metal body to be prepared, and is liable to make the body uneven in porosity and pore size. The drawback becomes more pronounced as the product increases in size or becomes more complex in shape. Further with metal materials which are difficult to shape or sinter, it is difficult to assure the product of mechanical strength.

The mechanical strength of sintered bodies can be enhanced by conducting the sintering treatment at a higher temperature to promote the sintering reaction, whereas particles then fuse to one another to result in smaller pore sizes and a decreased porosity. The fusion of particles impairs the function of the sintered body as a porous material since the open porosity (proportion of the pores communicating with outside the surface to the pores of the body) of the sintered body then lowers.

For example in the case of the dies for injection molding or die casting conducted under a high pressure, it is desired to reduce the pore size and lower the porosity to assure the porous body of strength and rigidity, but the conventional process has the problem that small pores become closed to lower the open porosity, rendering the porous body unserviceable as such.

Further in the case of filters for use at a high temperature inside refuse incinerators for filtering a gas or fine particles, some kinds of filters need to have increased pore sizes to give a higher porosity. However, the conventional production process fails to achieve a sufficient bond strength between the particles and encounters difficulty in ensuring the desired strength and rigidity if the pore sizes are increased to increase the porosity.

The present invention provides a process for producing a porous metal body free of the foregoing drawbacks or problems, and the porous metal body.

SUMMARY OF THE INVENTION

An object of the present invention is to provide a porous metal body having a desired high porosity and satisfactory mechanical properties, the porous metal body having a porosity of 7 to 50%, pore sizes of 1 to 500 μm and a pore distribution satisfying the relationship of:

$$(D_{95}-D_5)/D_{50} \leq 2.5$$

wherein $D_5$ is the pore size on the cumulative distribution curve of the pore sizes at a cumulative frequency of 5%, $D_{50}$ is the pore size on the curve at a cumulative frequency of 50% and $D_{95}$ is the pore size on the curve at a cumulative frequency of 95%.

Another object of the present invention is to provide a process for producing a porous metal body having a desired high porosity and satisfactory mechanical properties by pressing a metal powder having a predetermined particle-size distribution to shape, and sintering the resulting shaped body by hot isostatic pressing.

Still another object of the invention is to provide a process for producing a porous metal body having a desired high porosity and satisfactory mechanical properties by enclosing in a capsule a metal powder having a predetermined particle-size distribution, subjecting the encapsulated powder to a primary sintering treatment in an isostatic medium to form a primary sintered porous body, and heat-treating the primary sintered body with the capsule removed or without removing the capsule.

BRIEF DESCRIPTION OF THE DRAWING

FIG. 1 is a diagram for illustrating the cumulative distribution curve of the pore sizes of a porous metal body.

DETAILED DESCRIPTION OF THE INVENTION

The porous metal body of the present invention has a porosity of 7 to 50%, pore sizes of 1 to 500 μm and a pore distribution satisfying the relationship of:

$$(D_{95}-D_5)/D_{50} \leq 2.5 \tag{1}$$

wherein $D_5$ is the pore size on the cumulative distribution curve of the pore sizes at a cumulative frequency of 5%, $D_{50}$ is the pore size on the curve at a cumulative frequency of 50% and $D_{95}$ is the pore size on the curve at a cumulative frequency of 95%.

The porosity should be 7 to 50% because if the porosity is smaller than 7%, the pores in the sintered body become almost closed, rendering the body impaired in its function as a porous material, and further because if the porosity is over 50%, the porous body is greatly reduced in strength and rigidity. When the mechanical strength is especially of importance as is the case with the material for forming dies, the porosity should be adjusted preferably to the range of 10 to 35%, more preferably to 15 to 30%. Further when gas permeability is considered important as in the case of the material for forming filters, the porosity should be adjusted preferably to the range of 15 to 40%, more preferably to 20 to 35%.

The porous metal body of the invention is allowed to have a distribution of relatively large pores of up to 500 µm in size. The maximum pore size thus made greater than that of conventional common porous bodies permits gases and fine particles to pass through the porous body with a greatly improved efficiency while facilitating removal of fine particles trapped in the pores by washing. However, a distribution of large pores in excess of 500 µm in size makes it difficult for the porous body to retain strength and rigidity even if the porosity is limited to not greater than 50%. Accordingly, 500 µm is the upper limit for the pore sizes. When it is desired to abundantly distribute pores of small sizes as in the case of the material for forming filters, the pore sizes are adjusted preferably to the range of 3 to 50 µm, more preferably to 5 to 30 µm. When relatively large pore sizes are desirable as is the case with the material for forming filters, the pore sizes are adjusted preferably to the range of 30 to 500 µm, more preferably to 50 to 300 µm.

When the pore-size distribution of the porous metal body of tile invention is represented by a cumulative distribution curve (see FIG. 1), the pore sizes $D_5$, $D_{50}$ and $D_{95}$ on tile curve corresponding to cumulative frequencies of 5%, 50 and 95%, respectively, have the relationship of the foregoing expression (1).

The cumulative distribution curve of the pore sizes is obtained by measuring tile pore sizes of the porous body, counting the number of pore size in the increasing order of the pore sizes and determining the cumulative number (count) of pore sizes.

The ratio of the difference between the pore sizes $D_5$ and $D_{95}$ to the pore size $D_{50}$ (average pore size), that is, $(D_{95}-D_5)/D_{50}$, is limited to not greater than 2.5 to restrict the presence of very small pores which will not contribute substantially to the characteristics of the porous structure and large pores which impair the strength of the porous body. More preferably, the ratio is up to 1.5.

The porous body of the present invention has improved usefulness for structural members, functional members, etc. It is usable for various applications, for example, as molding or shaping dies for which gas permeability, heat-insulating properties and high mechanical strength are desired, filters for filtering gases and fine particles, catalyst carriers or sensors of which permeability and a large specific surface area are required, or soundproof or damping materials which are outstanding in vibration attenuation characteristics.

The metal for constituting the porous metal body of the present invention is selected according to the use of the body and the condition under which it is used. Examples of useful metals are stainless steels (SUS304, SUS630, etc.), tool steels (SKD61, SKD11, etc.), maraging steels (18Ni type, 20Ni type, etc.), high-speed steels (SKH51, SKH55, etc.) and nonferrous metals (aluminum or alloys thereof, titanium or alloys thereof, and copper or alloys thereof).

A first process for producing the porous metal body of the present invention comprises pressing a metal powder to shape and sintering the resulting shaped body by a hot isostatic pressing treatment.

It is desired that the metal powder to be used have a particle-size distribution satisfying the expression (2):

$$(R_{95}-R_5)/R_{50} \leq 2.5 \qquad (2)$$

wherein $R_5$, $R_{50}$ and $R_{95}$ are the particle sizes on the cumulative distribution curve of the particle sizes of the powder corresponding to cumulative frequencies of 5%, 50% and 95%, respectively.

The cumulative distribution curve of the particle sizes is obtained by measuring the particle sizes of the metal powder, counting the number of particle size in the increasing order of the particle sizes and determining the cumulative number (count) of particle sizes.

In the case where the powder used has such a particle-size distribution that the ratio of the difference between the particles sizes $R_{95}$ and $R_5$ to the particle size $R_{50}$ (average particle size), i.e., the value of $(R_{95}-R_5)/R_{50}$, is great, large voids are liable to occur among the particles, while the voids among particles are likely to be clogged with fine particles. The former phenomenon results in an increased distribution of large pores in the porous body (sintered body), and the latter in a diminished distribution of open pores. To avoid such objection, it is desired to use a powder having its particle-size distribution so adjusted that the value of $(R_{95}-R_5)/R_{50}$ is up to 2.5, more desirably up to 1.5.

It is suitable that the average particle size $R_{50}$ of the powder be in the range of about 10 to about 1000 µm. When the body to be prepared has an abundant distribution of relatively small pores like the material for forming dies, it is desirable to use a powder which is about 10 to about 75 µm in average particle size $R_{50}$. On the other hand, when an abundant distribution of large pores is desirable as in the material for filters, it is preferred to use a coarse-particle powder which is about 300 to about 1000 µm in average particle size $R_{50}$.

In the first production process of the invention, the starting material powder is pressed into a shaped body in a conventional manner, for example, by uniaxial pressing, extrusion or cold isostatic pressing (CIP). The CIP method is suitable in that the powder shaped body can be obtained with high homogeneity, for example, even when the body has a large size or complex shape.

The relative density of the powder shaped body is controlled to the range of about 30 to about 90%, preferably 50 to 80%, in accordance with the pore distribution characteristics required of the porous body as sintered.

The shaping pressure to be applied to the powder varies with the type of powder. For example in the case where an atomized powder in the form of nearly spherical particles is to be shaped by CIP, a pressure of about 50 to about 250 MPa is applicable. The relative density of the powder shaped body is controlled, for example, by varying the pressure to be applied for shaping or the particle-size distribution of the starting material powder.

In the hot isostatic pressing treatment (HIP treatment) of the production process of the present invention, the pressure of the isostatic medium (Ar, $N_2$ or like inactive fluid) acts on the external surface of the powder shaped body and at the same time, also acts on the body internally thereof through the pores in the surface. Thus, the sintering reaction of the shaped body according to the invention takes place while the pressure of the isostatic medium acting on the external surface is held in balance with that acting on the body in its interior. Consequently, the sintering reaction strengthens the bonds between the particles while permitting the shaped body to retain its porous structure with a distribution of open pores left intact, giving a finished porous metal body which has a high porosity and satisfactory mechanical properties. Incidentally, the closed pores (the pores included in the pores of the sintered body and not communicating with the outside of the surface) can be eliminated under pressure by adjusting the sintering conditions to give the porous metal body further improved mechanical properties.

The sintering treatment (HIP treatment) of the powder shaped body is conducted with the porous surface thereof brought into direct contact with the isostatic medium without encapsulating or coating the body.

Assuming that the melting point of the metal of the powder shaped body is TK (melting point T as expressed in absolute temperature), the temperature for the HIP treatment is adjusted to a temperature obtained by multiplying the melting point TK by a numerical value in the range of 0.7 to 0.95 (for example, to the range of 0.7×1700K to 0.95× 1700K when the melting point is 1700K (i.e., 1190K to 1615K)) because if the temperature is in this range, the particle-to-particle bonds can be strengthened efficiently by the sintering reaction without permitting melting and agglomeration of the particles and the attendant impairment of the pore distribution characteristics. The pressure to be exerted by the isostatic medium is in the range of 50 to 120 MPa to be suitable, and the treating time is preferably about 0.5 to about 8 hours.

The HIP treatment causes the pressure of the isostatic medium to act on the powder shaped body both externally and internally thereof to result in the advantage that the sintering reaction can be carried out effectively as required for strengthening the bonds between the particles while allowing the shaped body to retain its porous structure.

The HIP treatment of metal powders, although known as an industrial method of producing sintered alloy products, is intended to prepare a product having high compactness nearly corresponding to the true density. The treatment is usually practiced for a starting powder as enclosed in an evacuated capsule so that the powder can be fully compacted by compression. There are also cases wherein the starting powder is pressed for shaping, followed by the HIP treatment of the shaped body, whereas even in such a case, the powder shaped body is generally coated with a gastight film (e.g., a glass film or vacuum-deposited film) over the surface and then subjected to the HIP treatment with the pores sealed off. Unlike these conventional modes of HIP treatment, the treatment of the invention is conducted in such a mode that the pressure of the isostatic medium is transmitted to the interior of the powder shaped body utilizing the distribution of open pores thereof. Consequently, the porous body obtained can be given an improved porosity and higher mechanical strength desired for various structural members and functional members.

The present invention provides a second process for producing a porous metal body which process comprises enclosing a metal powder in a capsule, subjecting the encapsulated powder to a primary sintering treatment in an isostatic medium to form a primary sintered porous body, and heat-treating the primary sintered body with the capsule removed or without removing the capsule.

As is the case with the first production process, the metal powder to be used has a particle-size distribution satisfying the foregoing expression (2). Preferably, the powder is in the range of about 10 to about 1000 μm in average particle size.

The metal powder is filled into a capsule of suitable material (e.g., mild steel), followed by deaeration (for example, to $1\times10^{-1}$ to $1\times10^{-3}$ torr) and sealing.

Assuming that the melting point of the metal of the metal powder is TK (melting point T as expressed in absolute temperature), the heating temperature for the HIP treatment of the powder for preparing the primary sintered body in the second production process of the invention is adjusted to a temperature obtained by multiplying the melting point TK by a numerical value in the range of 0.35 to 0.85, i.e., to 0.35 TK to 0.85 TK. The pressure to be applied is adjusted to the range of 5 to 150 MPa. If the treatment is conducted at a heating temperature of lower than 0.35 TK under a pressure of less than 5 MPa, the formation of the primary sintered body requires a longer period of time, or depending on the type of metal powder, it is difficult to form a primary sintered body which can be handled satisfactorily even when the treatment is for a lengthened period of time. On the other hand, if the treatment is conducted at a heating temperature of higher than 0.85 TK under a pressure in excess of 150 MPa, the particles of the metal powder fuse to one another unnecessarily, encountering difficulty in giving a primary sintered body of high porosity. When held under the low-temperature and low-pressure conditions so controlled as specified above for a suitable length of time (about 0.5 to 8 hours), the metal powder softens suitably for the particles to bond to one another, forming a primary sintered body of high porosity.

Assuming that the melting point of the metal of the primary sintered body is TK (melting point T as expressed in absolute temperature), the temperature of the heat-treatment of the sintered body in the second production process of the invention is adjusted to a temperature obtained by multiplying the melting point TK by a numerical value in the range of 0.6 to 0.95, i.e., to 0.6 TK to 0.95 TK. If the temperature of the treatment is lower than 0.6 TK, it is difficult to efficiently effect a diffusion bonding reaction at the contact interface between the particles, whereas temperatures in excess of 0.95 TK result in a promoted cohesion reaction between the particles and are likely to impair the pore distribution of the primary sintered body. It is suitable that the treating time be about 5 to about 15 hours.

The primary sintered body may be heat-treated as withdrawn from the capsule or as enclosed therein. The primary sintered body is low in the bond strength between the particles, therefore fragile if the material of the powder is not amenable to sintering, and liable to break or collapse when the capsule is machined to withdraw the sintered body from the capsule or when handled as withdrawn from the capsule. The trouble involved in such a case is avoidable by heat-treating the sintered body as enclosed in the capsule to strengthen the bonds between the particles and thereafter withdrawing the body from the capsule. The primary sintered body may be heat-treated as encapsulated also in the case where the starting powder is an active material. The treatment can then be carried out in the atmosphere without necessitating a vacuum furnace or a furnace having a particular atmosphere.

EXAMPLES

Example 1

The first production process of the invention was practiced in this example.

Starting powders comprising one of the two kinds of metals given below were prepared first.

Starting Powders

A: Atomized powder of stainless steel (corresponding to JIS G4303 SUS 310S) (C: 0.02%, Si: 1.0%, Mn: 0.1%, Cr: 18.3%, Ni: 10.8%, the balance substantially Fe)

B: Atomized powder of alloy tool steel (corresponding to JIS G4404 SKD61) (C: 0.38%, Si: 0.9%, Mn: 0.01%, Cr: 5.25%, Mo: 1.20%, V: 2.0%, the balance substantially Fe)

Production of Porous Body Samples

Samples No. 1 to No. 6 of porous bodies of the invention were produced by the following procedure using the starting powders. Table 1 shows the materials of the powders and the particle-size distribution thereof.

The starting powder was enclosed in a rubber die and shaped by CIP to obtain a powder shaped body (300×300×300 mm in size). Table 1 shows the pressure applied for CIP and the relative density of the shaped body.

Next, the powder shaped body was placed into an HIP apparatus and sintered to obtain a porous metal body. Table 1 shows the heating temperature, pressure and treating time of the HIP sintering treatment.

Furthermore, Sample No. 7 of porous body for comparison was prepared from the starting powder A by a conventional process. The starting powder, having the particle-size distribution shown in Table 1, was shaped by a uniaxial press (pressure: 2000 kgf/cm$^2$), and the shaped body obtained was sintered in an atmosphere of $1\times10^{-3}$ torr at a temperature of 1200° C. for 4 hours to form a porous body (300×300×300 mm in size).

Evaluation of Characteristics of Samples

Table 2 shows the characteristics of the samples prepared.

"Porosity" was determined by calculating the ratio of the density of the sample to the density of the sample as compacted 100% and subtracting the value of the ratio from 1.

"Open porosity" was determined based on a measurement obtained by a porosimeter. The porosimeter was used for forcing a fluid (mercury) into pores in the sample and measuring as pores the amount of fluid ingressing into the pores (open pores) communicating with the outside of the sample surface.

"Venting property" is expressed in an air pressure (kgf/cm$^2$) required for causing air to pass through the sample.

"Flexural strength" is expressed in three-point flexural strength (kgf/cm$^2$) as determined by the bending test of JIS B1601 (span distance: 30 mm).

Table 2 reveals that as compared with comparative Sample No. 7, Samples No. 1 to No. 3 and No. 6 of the invention are smaller in average pore size $D_{50}$ and are nevertheless relatively greater in open porosity, more excellent in gas permeability, more porous and exceedingly higher in mechanical strength. Sample No. 4 of the invention, although comparable to comparative Sample No. 7 in strength, is greater in pore size, porosity and open porosity, permitting a gas to pass therethrough with a remarkably high efficiency. Sample 5 of the invention, although prepared from a different material, has a high open porosity, enhanced venting property and improved strength, and is manifestly different from comparative Sample No. 7.

TABLE 1

| No. | Material kind of starting powder | Particle-size distribution of starting powder | | | | Pressure for CIP kgf/cm$^2$ | Relative density of shaped body % | HIP Sintering conditions | | |
|---|---|---|---|---|---|---|---|---|---|---|
| | | $R_{50}$ μm | $R_5$ μm | $R_{95}$ μm | $\frac{R_{95}-R_5}{R_{50}}$ | | | Temp. °C. | Pressure MPa | Time Hr |
| 1 | A | 105 | 15 | 190 | 1.67 | 1500 | 70 | 1150 (0.84TK) | 100 | 2 |
| 2 | A | 110 | 13 | 185 | 1.56 | 1500 | 70 | 1280 (0.92TK) | 100 | 2 |
| 3 | A | 105 | 15 | 190 | 1.67 | 2500 | 77 | 1150 (0.84TK) | 100 | 2 |
| 4 | A | 400 | 270 | 480 | 0.53 | 1500 | 53 | 1150 (0.84TK) | 100 | 2 |
| 5 | B | 125 | 15 | 190 | 1.40 | 1500 | 58 | 1150 (0.80TK) | 100 | 2 |
| 6 | A | 50 | 10 | 70 | 1.20 | 1500 | 75 | 1150 (0.84TK) | 100 | 2 |
| 7 | A | 60 | 15 | 180 | 2.75 | | | --- | | |

TABLE 2

| No. | Pore distribution characteristics | | | | | Porosity % | Open porosity % | Venting property kgf/cm$^2$ | Flexural strength kgf/mm$^2$ |
|---|---|---|---|---|---|---|---|---|---|
| | $D_{50}$ μm | $D_5$ μm | $D_{95}$ μm | $\frac{D_{95}-D_5}{D_{50}}$ | Max. pore size $D_{100}$ μm | | | | |
| 1 | 28 | 5 | 46 | 1.46 | 50 | 19 | 18 | 3 | 22 |
| 2 | 25 | 5 | 43 | 1.52 | 50 | 13 | 12 | 4 | 85 |
| 3 | 26 | 5 | 44 | 1.50 | 50 | 17 | 16 | 3 | 31 |
| 4 | 180 | 40 | 325 | 1.58 | 350 | 40 | 38 | 2 | 13 |
| 5 | 28 | 5 | 45 | 1.43 | 50 | 35 | 33 | 3 | 15 |
| 6 | 28 | 10 | 40 | 1.07 | 50 | 19 | 18 | 3 | 20 |
| 7 | 34 | 5 | 48 | 1.26 | 50 | 20 | 15 | 5 | 13 |

Example 2

The second production process of the invention was practiced in this example.

Starting Powders

Starting powders comprising one of the two kinds of metals A and B were prepared as in Example 1. These metals are exactly the same as in Example 1.

Production of Porous Body Samples

Samples No. 11 to No. 18 of porous bodies of the invention were produced by the following procedure using the starting powders. Table 3 shows the materials of the powders and the particle-size distribution thereof.

The starting powder was hermetically enclosed in the vacuum shown in Table 3 within a mild steel capsule. The capusule was then placed into an HIP apparatus and subjected to a primary sintering treatment. Table 3 shows the temperature, pressure and treating time for the primary sintering treatment. The primary sintered body was placed as encapsulated into a heating furnace and heat-treated. Table 3 shows the treating temperature and time. After the heat treatment, the capsule was removed by machining to obtain a porous metal body (300×300×300 mm in size).

Furthermore, Samples No. 19 to No. 21 of porous bodies for comparison were prepared from the starting powder A.

Sample No. 19 was prepared by the conventional process. The starting powder, having the particle-size distribution shown in Table 3, was shaped by a uniaxial press (pressure: 2000 kgf/cm$^2$), and the shaped body obtained was sintered in an atmosphere of 1×10$^{-3}$ torr at a temperature of 1200° C. for 4 hours to form a porous body (300×300×300 mm in size).

Each of the starting powders used for Samples No. 20 and No. 21 which are comparative examples departs from the scope of the invention in particle-size distribution. The starting powder with the particle-size distribution shown in Table 3 was hermetically enclosed in the vacuum of Table 3 within a mild steel capsule. The capsule was then placed into the HIP apparatus and subjected to a primary sintering treatment. Table 3 shows the temperature, pressure and treating time for the primary sintering treatment. The primary sintered body was subsequently placed as encapsulated into the heating furnace and heat-treated. Table 3 shows the heat-treating temperature and time. The capsule was thereafter removed by machining to obtain a porous metal body (300×300×300 mm in size).

Table 4 shows the characteristics of the samples prepared. Table 4 reveals that Samples No. 11 to No. 13 and No. 16 of the invention are comparable to comparative Sample No. 19 in average pore size $D_{50}$ but are higher in open porosity, gas permeability and exceedingly higher in mechanical strength. Sample No. 14 of the invention, although comparable to comparative Sample No. 19 in strength, is greater in pore size, porosity and open porosity, permitting a gas to pass therethrough with a remarkably high efficiency. Samples No. 15 and No. 17 of the invention, although prepared from a different material, have a high open porosity, enhanced venting property and improved strength. As compared with Sample No. 14 of the invention, Sample No. 18 of the invention is smaller in the value $(D_{95}-D_5)/D_{50}$, comparable in porosity and open porosity and yet remarkably improved in flexural strength.

Samples No. 20 and No. 21 are beyond 2.5 in the ratio $(R_{95}-R_5)/R_{50}$ as to the particle-size distribution of the starting powder used, and are beyond the limit 2.5 for the invention with respect to the pore distribution characteristic value $(D_{95}-D_5)/D_{50}$. Sample No. 20 has the same average pore size $D_{50}$ as Sample No. 13 and is comparable thereto in porosity and open porosity and yet inferior in venting property and flexural strength to Sample No. 13. Sample No. 21, although nearly approximate to Sample No. 14 in average pore size, is as large as 650 μm in maximum pore size and has a lower strength.

TABLE 3

| No. | Material kind of starting powder | Particle-size distribution of starting powder | | | | Vacuum in capsule Torr | Primary sintering conditions (HIP) | | | Heat-treating conditions | |
|---|---|---|---|---|---|---|---|---|---|---|---|
| | | $R_{50}$ μm | $R_5$ μm | $R_{95}$ μm | $\frac{R_{95}-R_5}{R_{50}}$ | | Temp. °C. | Pressure MPa | Time Hr | Temp. °C. | Time Hr |
| 11 | A | 105 | 15 | 190 | 1.67 | 1 × 10$^{-2}$ | 600(0.52TK) | 100 | 2 | 1100(0.82TK) | 4 |
| 12 | A | 110 | 13 | 185 | 1.56 | 1 × 10$^{-2}$ | 600(0.52TK) | 100 | 2 | 1200(0.88TK) | 4 |
| 13 | A | 105 | 15 | 185 | 1.62 | 1 × 10$^{-2}$ | 700(0.58TK) | 100 | 2 | 1100(0.82TK) | 4 |
| 14 | A | 400 | 270 | 480 | 0.53 | 1 × 10$^{-2}$ | 650(0.55TK) | 100 | 2 | 1100(0.82TK) | 4 |
| 15 | B | 125 | 15 | 190 | 1.40 | 1 × 10$^{-2}$ | 550(0.46TK) | 100 | 2 | 1100(0.77TK) | 4 |
| 16 | A | 90 | 20 | 240 | 2.44 | 5 × 10$^{-2}$ | 600(0.52TK) | 100 | 2 | 1100(0.82TK) | 4 |
| 17 | B | 120 | 35 | 305 | 2.25 | 1 × 10$^{-2}$ | 550(0.46TK) | 100 | 2 | 1100(0.77TK) | 4 |
| 18 | A | 275 | 135 | 540 | 1.47 | 7 × 10$^{-3}$ | 650(0.55TK) | 100 | 2 | 1100(0.82TK) | 4 |
| 19 | A | 90 | 20 | 240 | 2.44 | | --- | | | | |
| 20 | A | 120 | 20 | 350 | 2.75 | 2 × 10$^{-2}$ | 620(0.53TK) | 100 | 2 | 1100(0.82TK) | 4 |
| 21 | A | 350 | 25 | 1000 | 2.79 | 3 × 10$^{-3}$ | 620(0.53TK) | 100 | 2 | 1100(0.82TK) | 4 |

TABLE 4

| | Pore distribution characteristics | | | | | | | Venting | Flexural |
|---|---|---|---|---|---|---|---|---|---|
| | $D_{50}$ | $D_5$ | $D_{90}$ | $D_{90}-D_5$ | Max. pore size | Porosity | Open Porosity | property | strength |
| No. | μm | μm | μm | $D_{50}$ | $D_{100}$ μm | % | % | kgf/cm² | kgf/mm² |
| 11 | 35 | 5 | 48 | 1.23 | 50 | 24 | 23 | 3 | 45 |
| 12 | 35 | 5 | 47 | 1.20 | 50 | 24 | 23 | 3 | 50 |
| 13 | 35 | 5 | 45 | 1.14 | 50 | 19 | 18 | 3 | 55 |
| 14 | 180 | 40 | 330 | 1.61 | 350 | 38 | 35 | 2 | 12 |
| 15 | 48 | 8 | 65 | 1.19 | 70 | 23 | 21 | 3 | 13 |
| 16 | 35 | 20 | 65 | 1.29 | 70 | 24 | 23 | 3 | 45 |
| 17 | 48 | 25 | 75 | 1.04 | 95 | 23 | 21 | 3 | 13 |
| 18 | 180 | 70 | 250 | 1.00 | 350 | 38 | 35 | 2 | 36 |
| 19 | 34 | 18 | 85 | 1.97 | 100 | 20 | 15 | 5 | 12 |
| 20 | 35 | 5 | 120 | 3.29 | 200 | 20 | 18 | 4 | 38 |
| 21 | 190 | 10 | 500 | 2.58 | 650 | 27 | 25 | 3 | 10 |

As will be apparent from the foregoing description, the porous metal bodies prepared by the production processes of the present invention are improved in porosity characteristics and mechanical strength. Accordingly, when used for component members or attachment members of resin molding or metal casting dies and the like, or when used for forming such dies in their entirety, the porous body of the invention assures an efficient molding or casting operation, improves the life of the dies and gives an improved quality to moldings or castings. The porous metal bodies of the invention are further useful as various sensors, catalyst carriers, filters, partitions, etc. or as heat-insulating materials, soundproof materials, damping materials, etc., enabling these means or materials to perform more sophisticated functions.

What is claimed is:

1. A process for producing a porous metal body having a porosity of 7 to 50%, pore sizes of 1 to 500 μm and a pore distribution satisfying the relationship of:

$$(D_{95}-D_5)/D_{50} \leq 2.5$$

wherein $D_5$ is the pore size on the cumulative distribution curve of the pore sizes at a cumulative frequency of 5%, $D_{50}$ is the pore size on the curve at a cumulative frequency of 50% and $D_{95}$ is the pore size on the curve at a cumulative frequency of 95%, the process comprising:

(a) the step of pressing a metal powder into a shaped body, the metal powder, when having its particle sizes represented by a cumulative distribution curve, satisfying the relationship of:

$$(R_{95}-R_5)/R_{50} \leq 2.5$$

wherein $R_5$ is the particle size at a cumulative frequency of 5%, $R_{50}$ is the particle size at a cumulative frequency of 50% and $R_{95}$ is the particle size at a cumulative frequency of 95%, $R_{50}$ being in the range of 10 to 1000 μm, and (b) the step of sintering the shaped body by hot isostatic pressing to obtain the porous metal body.

2. A process as defined in claim 1 wherein the sintering step (b) is performed at a temperature of 0.7 TK to 0.95 TK wherein TK is the melting point (melting point T as expressed in absolute temperature) of the powder metal and under a pressure of 50 to 120 MPa.

3. A process for producing a porous metal body having a porosity of 7 to 50%, pore sizes of 1 to 500 μm and a pore distribution satisfying the relationship of:

$$(D_{95}-D_5)/D_{50} \leq 2.5$$

wherein $D_5$ is the pore size on the cumulative distribution curve of the pore sizes at a cumulative frequency of 5%, $D_{50}$ is the pore size on the curve at a cumulative frequency of 50% and $D_{95}$ is the pore size on the curve at a cumulative frequency of 95%, the process comprising the steps of:

(a) enclosing a metal powder in a capsule, the metal powder, when having its particle sizes represented by a cumulative distribution curve, satisfying the relationship of:

$$(R_{95}-R_5)/R_{50} \leq 2.5$$

wherein $R_5$ is the particle size at a cumulative frequency of 5%, $R_{50}$ is the particle size at a cumulative frequency of 50% and $R_{95}$ is the particle size at a cumulative frequency of 95%, $R_{50}$ being in the range of 10 to 1000 μm, (b) subjecting the encapsulated metal powder to a primary sintering treatment in an isostatic medium to form a primary sintered porous body, and (c) heat-treating the primary sintered body.

4. A process as defined in claim 3 wherein the primary sintering treatment of the step (b) is conducted at a temperature of 0.35 TK to 0.85 TK wherein TK is the melting point (melting point T as expressed in absolute temperature) of the powder metal and under a pressure of 5 to 150 MPa, and the heat treatment of the step (c) is conducted at a temperature of 0.6 TK to 0.95 TK.

5. A process as defined in claim 3 which has the step of removing the capsule between the steps (b) and (c).

6. A porous metal body obtained by sintering a metal powder by hot isostatic pressing, the porous metal body having a porosity of 7 to 50%, pore sizes of 1 to 500 μm and a pore distribution satisfying the relationship of:

$$(D_{95}-D_5)/D_{50} \leq 2.5$$

wherein $D_5$ is the pore size on the cumulative distribution curve of the pore sizes at a cumulative frequency of 5%, $D_{50}$ is the pore size on the curve at a cumulative frequency of 50% and $D_{95}$ is the pore size on the curve at a cumulative frequency of 95%.

7. A porous metal body as defined in claim 6 which is used as a material for forming resin molding or metal casting dies and is 10 to 35% in porosity and 3 to 50 μm in pore size.

8. A porous metal body as defined in claim 6 which is used as a material for forming filters for filtering gases or fine particles and is 15 to 40% in porosity and 30 to 500 μm in pore size.

* * * * *